US008271527B2

(12) United States Patent
Frieder et al.

(10) Patent No.: US 8,271,527 B2
(45) Date of Patent: Sep. 18, 2012

(54) REFINED PERMISSION CONSTRAINTS USING INTERNAL AND EXTERNAL DATA EXTRACTION IN A ROLE-BASED ACCESS CONTROL SYSTEM

(75) Inventors: Ophir Frieder, Chicago, IL (US); Shangping Ren, Lisle, IL (US)

(73) Assignee: Illinois Institute of Technology, Chicago, IL (US)

( * ) Notice: Subject to any disclaimer, the term of this patent is extended or adjusted under 35 U.S.C. 154(b) by 1783 days.

(21) Appl. No.: 10/926,548

(22) Filed: Aug. 26, 2004

(65) Prior Publication Data
US 2006/0047657 A1    Mar. 2, 2006

(51) Int. Cl.
*G06F 17/30* (2006.01)
(52) U.S. Cl. ....................................... 707/783
(58) Field of Classification Search .............. 707/3, 2, 707/9, 783
See application file for complete search history.

(56) References Cited

U.S. PATENT DOCUMENTS

| | | | | | |
|---|---|---|---|---|---|
| 5,911,143 | A * | 6/1999 | Deinhart et al. | ........... | 707/103 R |
| 6,023,765 | A * | 2/2000 | Kuhn | ................ | 726/4 |
| 6,029,182 | A * | 2/2000 | Nehab et al. | ............... | 715/205 |
| 6,038,563 | A * | 3/2000 | Bapat et al. | ................ | 707/10 |
| 6,094,649 | A * | 7/2000 | Bowen et al. | ................ | 707/3 |
| 6,199,067 | B1 * | 3/2001 | Geller | ................ | 707/10 |
| 6,202,066 | B1 * | 3/2001 | Barkley et al. | ............... | 707/785 |
| 6,516,315 | B1 | 2/2003 | Gupta | | |
| 6,574,736 | B1 * | 6/2003 | Andrews | ............ | 726/21 |
| 7,039,630 | B2 * | 5/2006 | Shimazu | ............ | 707/3 |
| 7,142,119 | B2 * | 11/2006 | Siefke et al. | ............... | 340/572.4 |
| 7,177,798 | B2 * | 2/2007 | Hsu et al. | ............. | 704/9 |
| 7,185,192 | B1 * | 2/2007 | Kahn | ............. | 713/155 |
| 2001/0056494 | A1 | 12/2001 | Trabelsi | | |
| 2002/0010679 | A1 | 1/2002 | Felsher | | |
| 2002/0023091 | A1 * | 2/2002 | Silberberg et al. | .......... | 707/103 Y |
| 2002/0026592 | A1 * | 2/2002 | Gavrila et al. | ............. | 713/201 |
| 2002/0031230 | A1 * | 3/2002 | Sweet et al. | ............. | 380/278 |
| 2002/0157023 | A1 | 10/2002 | Callahan et al. | | |
| 2002/0178119 | A1 * | 11/2002 | Griffin et al. | ............. | 705/54 |
| 2002/0188869 | A1 | 12/2002 | Patrick | | |
| 2003/0005117 | A1 | 1/2003 | Kang et al. | | |
| 2003/0097572 | A1 | 5/2003 | Doo et al. | | |
| 2003/0120593 | A1 | 6/2003 | Bansal et al. | | |
| 2003/0149714 | A1 | 8/2003 | Casati et al. | | |
| 2004/0098594 | A1 * | 5/2004 | Fleming et al. | ............. | 713/182 |
| 2004/0176968 | A1 * | 9/2004 | Syed et al. | ............. | 705/1 |
| 2004/0186836 | A1 * | 9/2004 | Schlesinger | ............. | 707/9 |
| 2004/0250120 | A1 * | 12/2004 | Ng | ............. | 713/201 |
| 2005/0021977 | A1 * | 1/2005 | Oberst | ............. | 713/182 |

(Continued)

OTHER PUBLICATIONS

*Role-Based Access Control Models*, publication No. 0018-9162/96, IEEE (1996), by Sandhu et al. (pp. 38-47).

(Continued)

*Primary Examiner* — Thanh-Ha Dang
(74) *Attorney, Agent, or Firm* — Pauley Petersen & Erickson

(57) ABSTRACT

The present invention can enable increasing refinement of role-based permission to access data within a Role Based Access Control (RBAC) controlled computer system by enabling constraints to be written on the role-based permissions. The constraints may utilize each and every type or combination of subject, object, or environment information extracted from sources internal or external to the controlled computer system and may evaluate the content or context of the information extracted to enable refined and dynamic access after the role permission assignment and immediately before every access grant without the reassignment of roles.

26 Claims, 2 Drawing Sheets

U.S. PATENT DOCUMENTS

2006/0001544 A1* 1/2006 Siefke et al. ............... 340/572.4
2006/0031377 A1* 2/2006 Ng et al. ........................ 709/208

OTHER PUBLICATIONS

*An Approach to Engineer and Enforce Context Constraints in an RBAC Environment*, Association for Computing Machinery (ACM) (2003), by Neumann et al. (pp. 65-79).

*A Flexible Content and Context-based Access Control Model for Multimedia Medical Image Database Systems* (ACM) (2001), by Tzelepi et al. (8 pages).

*Generalized Role-Based Access Control*, publication No. 1063-6927/01, IEEE (2001), by Moyer et al.

*Securing Context-Aware Applications Using Environment Roles*, publication No. 1-58113-350-2/01/0005, ACM (2001), by Covington et al. (pp. 10-20).

*TRBAC: A Temporal Role-Based Access Control Model, ACM Transactions on Information and System Security* (vol. 4, No. 3, Aug. 2001), by Bertino et al. (pp. 191-223).

*An Introduction to Role-Based Access Control*, NIST/ITL Bulletin (Dec. 1995) (6 pages).

\* cited by examiner

REFINED PERMISSION CONSTRAINTS USING INTERNAL AND EXTERNAL DATA EXTRACTION IN A ROLE-BASED ACCESS CONTROL SYSTEM

BACKGROUND OF THE INVENTION

1. Field of the Invention

The present invention relates to a system or method of Role Based Access Control (RBAC) for computer systems, which gains increased utility by enabling refined constraints on a role's access permissions at each request for access to an object. More particularly, permission constraints may be based upon the assessment of any or all of the subject, object, or environment information, which information may be gathered by data extraction from a variety of sources both internal to the controlled computer system and external to the controlled computer system, for evaluation relative to the constraints.

2. Discussion of the Related Art

The technique of Role Based Access Control has greatly increased the utility of computer system access control. By pre-qualifying individuals, or subjects, in an organization into defined roles (e.g., doctor, head nurse, nurse) which are granted defined permission access to operate on the records, or objects; Role Based Access Control removes the necessity of developing defined access permission for each individual user to objects within the computer system. However, networked access to objects within the computer system, e.g., electronic data, has given rise to increased concerns for security, e.g., access to data such as proprietary information within an organizational structure or the privacy of medical records. Increasingly sophisticated demands are therefore being placed on the restriction of access to objects within the computer system, leading to a need for finer-grained access control than can be managed by traditional Role Based Access Control techniques that rely only on roles (and conditions on those roles; e.g., time constraints or location constraints) to establish permission for access to objects within the computer system.

After the RBAC model of Sandhu et al. in *Role Based Access Control Models*, publication number 0018-9162/96, IEEE, 1996, (hereinafter "Sandhu") several additional versions which limit role assignment, or which have increasing constraints on the granting of permissions were proposed, including: temporal and environmental limitations on role assignment. Some permission constraints have been proposed based on limited "context" evaluations such as Neumann et al., *An Approach to Engineer and Enforce Context Constraints in an RBAC Environment*, 2003, Association for Computing Machinery (ACM); and specialized content, such as Tzelepi et al., *A Flexible Content and Context-based Access Control Model for Multimedia Medical Image Database Systems*, 2001, ACM.

However, known RBAC systems have not been enabled to use context within all information categories, including and especially subject context. Further, known RBAC systems have not utilized entire categories of content since they have been limited to the controlled computer system. Thus, known RBAC systems have yet to enable system administrators to establish highly flexible constraints on a role's permission for dynamic granting of access to objects.

Thus, there is a need for an RBAC method which is enabled to gather information, i.e., seek and obtain data and compare such data to determine contexts necessary for the utilization of increasingly sophisticated constraints. There is a further need for access to be evaluated dynamically (i.e., at runtime, potentially changing throughout the duration of the session) based on constraints with respect to any or all combinations of subject information, object information, and environment information.

DEFINITIONS

"Access" is a specific type of interaction or operation between a subject and an object that results in the flow of information from one to the other, per Sandhu.

A "controlled computer system" denominates that electronic system in which the RBAC is installed in and therefore controls access to.

"Dynamically altered within a session" means that access can be altered and granted anytime before run time of the access grant, but without changing the assigned role.

"Each and every type or combination of" is used within the present application to mean that information is selectable from every category of information and from every combination of every category of information.

"Extracted information" is any information gathered or derived through the data retrieval or data extraction functionality of the present system, including but not limited to, text retrieval or term extraction from the requested objects or environmental content retrieved from outside the controlled computer system. It will thus be realized that the information extraction can be internal, i.e., within the controlled computer system, and external, i.e., outside of the controlled computer system, or both.

"Information" as used herein includes context, which is the relation of two or more data items, and content, which is the actual data.

"Object" is a passive entity that contains or receives information, per Sandhu.

"Subject" is an active entity, generally in the form of a person, process, or device, which causes information to flow among objects or changes the system state, per Sandhu, and as used herein is generally related to the user, including role assignment to the user. "User" may be thought of for explanatory purposes as a person who interacts directly with a controlled computer system, per Sandhu.

SUMMARY OF THE INVENTION

The present invention provides an RBAC method empowered to gather information, i.e., seek and obtain data and compare such data to determine contexts necessary for the utilization of increasingly sophisticated constraints. The present invention utilizes data extraction techniques to mine the wealth of content now available through larger networked sources, e.g., the Internet or any external databases accessible electronically either directly or indirectly by the controlled computer system. The present invention thus provides an RBAC method for the controlled computer system with sufficient content gathering or context analyzing capability, or both, to allow the use of easily formulated but refined constraints on permissions to access objects in an RBAC controlled computer system. Furthermore, the present invention is able to evaluate access grant dynamically (i.e., at runtime, potentially changing throughout the duration of the session) based on constraints with respect to each and every combination of subject information, object information, and environment information.

For present purposes, within an RBAC system, there is information subdivided into two kinds of information: content and context; and three categories of information, namely:

subject, e.g., user, information, object, e.g., document, information, and environment or all other information.

Of the two kinds of information, content is per se factual information and context is the relationship between a plurality of facts. Content can be gathered by the present invention from two sources, namely: internal, that is, available within the controlled computer system and external, that is, available outside of the controlled computer system.

The present invention utilizes data extraction, such as by information retrieval, data mining, or natural language processing techniques, to obtain more data, i.e., content or context, or both, than is available from the controlled computer system. With the larger amount of data, sometimes referred to herein as "full" data, the present invention can determine and use more context to create a wide variety of constraint considerations. With full context, the present invention can enable constraints to dynamically change a grant of access, i.e., essentially anytime within a session or request up to the decision point (runtime) of access grant.

For the three categories of information, full data retrieval for the subject category enables more data related to the user to be retrieved, e.g., who the subject is and who might be related to the subject such as parents or co-workers. Full data retrieval for the object category enables more data or metadata related to the object to be retrieved, e.g., content within, or ownership of, a record. Full data retrieval for the environment category enables more data not in the subject or object categories to be retrieved, e.g., recognized disease symptoms. Application of suitable data extraction techniques, e.g., information retrieval, data mining, or natural language processing, to accomplish the present invention is assumed to be within the ordinary skill of the art.

Thus, the larger amount of data may enable more sophisticated permission-granting rules to be established, such as contexts entirely within a category, e.g., family relationship contexts or working personnel relationships. These contexts may be established based on external data gathered about a subject. By also enabling data extraction internal to the controlled computer system, the present invention can also enhance the content available to set the constraints by extracting and evaluating object content based upon the actual data, and not just metadata, within the object requested. Also, increasingly sophisticated contexts between two categories may be had. For example, a so-called "application context" based upon both subject information, including assigned role(s), and object information, such as the relationship between the user and the data being accessed, may be attained. Also a so-called "system context" based on environment information and subject information, such as the relationship between a time window in which the object request is critical and the identity or role of a subject entitled to the critical information, may be attained. For instance, in a process of a complicated surgery, an anesthesiologist may need to obtain the genetic makeup of the patient but is allowed access to such data only at the time that the anesthesiologist needs to administer certain types of medication.

To further provide increased utility for RBAC systems, the present invention, by utilizing full content and full context, can enable dynamically changing access to objects, i.e., dynamic change of constraints and application of the permission-granting rules for a given role immediately before the run-time of every access determination. (All prior RBAC systems are believed to provide only static capabilities, i.e., access rights of a role remain constant throughout a session once the role of the subject is determined.) For example, access may change dynamically on a request-by-request basis, even within the same session, depending on potential environmental conditions, such as system context based on environment information (and subject information) such as in the above example where the elapsed effective time of an anesthetic may determine the urgency of an access request and thereby change the access permissions of the Anesthesiologist role.

By enabling extraction of subject, object, and environment content from internal and external sources, the present invention can utilize as much content and determine as much context as is necessary for refined and dynamic permission constraint writing, thereby enabling system administrators to easily write fine grained permission constraints necessary for proper access control to objects within a role-based access control system on an "as-needed" basis.

BRIEF DESCRIPTION OF THE DRAWINGS

The objects and features of this invention will be better understood from the following detailed description taken in conjunction with the drawings wherein.

DETAILED DESCRIPTION OF THE PREFERRED EMBODIMENTS

The exemplary embodiment of an RBAC system will be set forth in the context of a medical records access control system. Medical domains are challenging because, for example, of the complex relationships among medical personnel (subjects/users) within an organization, and the complex relationships among patients and caregivers and other users of the controlled computer system which may have some relationships with the patient. The medical records (objects) are also complex in their contents and may contain data related only by the fact that it has occurred in the same patient/owner of the record. Further, complex rules for granting or restricting access to the electronic records now occur and are enforceable by law. Further, granting timely and appropriate (e.g., using environment content and context) access to the records for the appropriate personnel may be critical to patients' lives.

Discussion of the modules of the exemplary RBAC method or system will be given herein with respect to specific functionalities, functional tasks, or task groupings that are in some cases arbitrarily assigned to the specific modules for explanatory purposes. It will be appreciated by the person having ordinary skill in the art that an RBAC system according to the present invention may be arranged in a variety of ways, or that functional tasks may be grouped according to other nomenclature or architecture than is used herein without doing violence to the spirit of the present invention.

Figure 1:
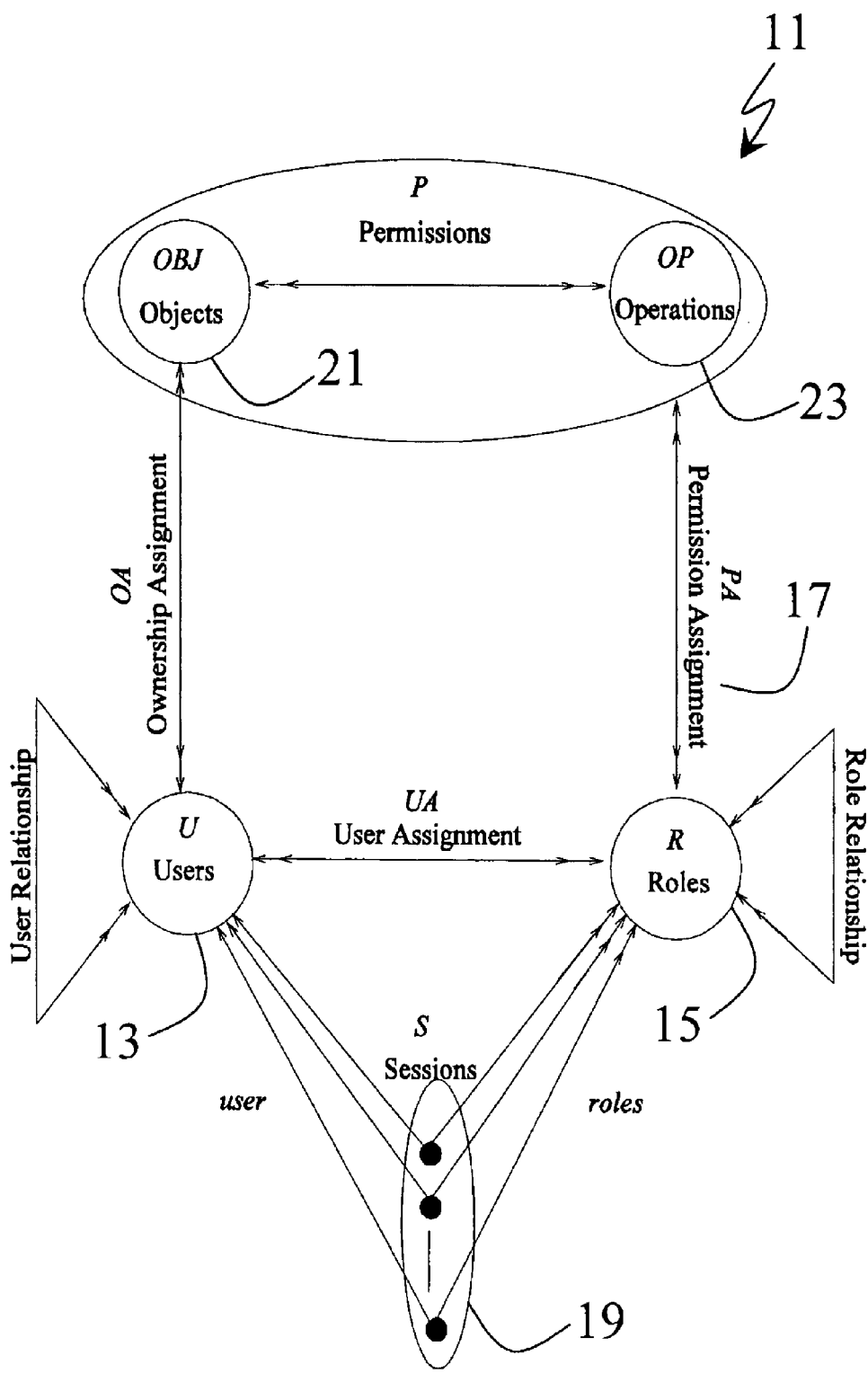
FIG. 1 is a schematic of an RBAC system with role permission capability as known in the art.

Referring to FIG. 1, an RBAC model 11 known in the art and operating by user-role assignment, includes: users, or subjects, 13, roles 15, and access permissions 17 assigned to the roles 15. Parts of FIG. 1 not necessary to an explanation of the present invention will not be elaborated on but are assumed to be understood by a person having ordinary skill in the art. When a user 13 initiates a request for object access at the session controller 19, the user 13 is verified as having a valid role 15. The permissions 17 allow role access to the objects 21, such as medical records, and determine which operations 23 the role 15 may perform on the objects 21.

Figure 2:
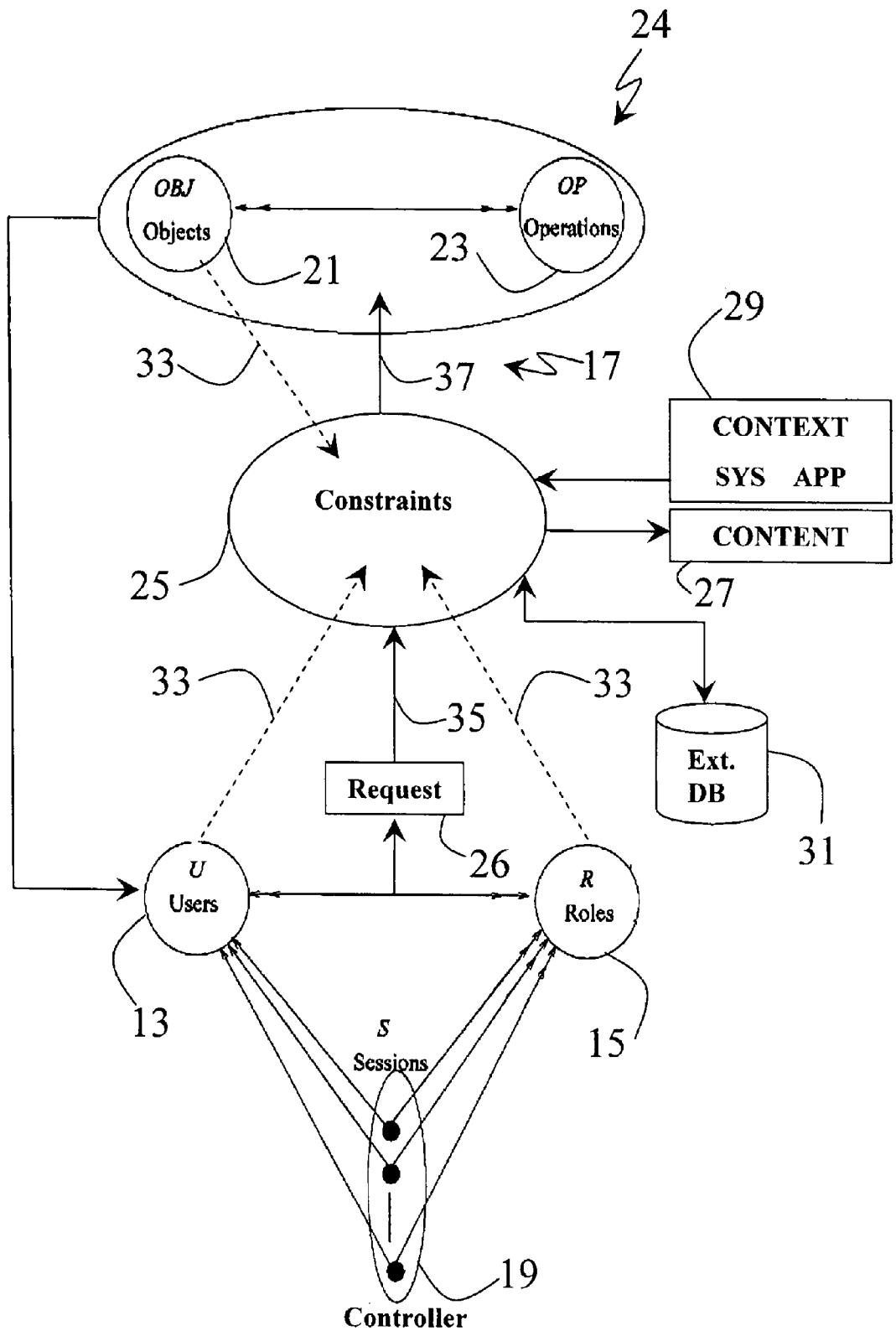
FIG. 2 is a schematic of an RBAC system and method according to the present invention with refined and dynamic permission constraint capability.

Referring to FIG. 2, the present invention presents a role-based access control system 24 for a controlled computer system having refined and dynamic permission constraints 25 which are tested against facts/data, i.e., content 27, or contexts 29 derived from the content, achieved through the use of data extraction, e.g., known information retrieval, data mining, and natural language processing techniques, represented by the external database 31 and the internal database data extraction represented by dotted lines 33, from each of the object 21, role 15 and user 13 domains indicating data extraction. It will be noted that data extraction is not limited herein to metadata searching but includes the ability to obtain actual text or other content from within the selected data constructs. The exemplary embodiment 24 of the present invention illustrated in FIG. 2 also includes users, or subjects, 13, roles 15, and access permissions 17 assigned to the roles 15. After the user 13 is verified as having a valid role 15 by the session controller 19, the user 13 initiates a request 26 for object access. The extracted data or content 27 may be gathered and compared to verify context 29 as set forth in the constraints 25. Content 27 may be gathered and contexts 29 verified for each and every information category (subject, object, environment) individually, or contexts verified between categories, such as application context APP formed between object content and subject content, or system context SYS formed between subject content and environmental content. Before access 37 to objects 21 is granted, each constraint 25 on the role permission 35 must be verified to limit the retrieval of data, or other operations 23 on the objects 21, to those intended by a system administrator (not shown). Constraints 25 on the role's permission 35 written about/against full content 27 and context 29 may then be tested and compared to each and every of the subject, object, or environment information. If the content and the context of the constraints are validated, access 37 is granted allowing the user (subject) 13 to receive permissible portions of the objects 21 and operate 23 upon them, such as view/copy/modify; according to the constraints 25 imposed on the role permission 35.

The specific tools, functionalities, or applications necessary to accomplish the present invention are considered to be within the skill of the art. For example, possible languages to specify constraints may include, for example, SQL (Structured Query Language), Relational Algebra, or Prepositional Logic or similar functionalities now known or later developed. Possible data extraction techniques may include approaches that rely upon, for example, part of speech tagging, conventional term extraction, term co-occurrence, inference networks, language models, or similar functionalities now known or later developed. Possible search mechanisms for locating content or context may include, for example, crawlers, mediators, text search engines, database management systems search approaches as used for relational, hierarchical, or other logical database models, geospatial database search approaches, or reconciled structured repository (both logical and physical) search routines, or similar constructs or functionalities now known or later developed.

PERMISSION CONSTRAINT EXAMPLES

Example 1

Head nurses can view all their department doctors' patients' medical records, except the medical records of the immediate family of said head nurses' colleagues within the same department.

Such a determination of colleagues may require extensive user identity knowledge besides that available from the user profile provided at log-in to the session, i.e., prior to the access request. The determination of immediate family may even require retrieval of data external to the controlled computer system. A parenthetical category review of Example 1 shows: head nurses (a role, or subject information) can view (operation) all their department doctors' patients' medical records (ownership or object information and relationship context of doctor and nurse), except (constraint on access) the medical records (objects) of their colleague's immediate family (possible environment or subject information or both, and including content and context) in the same department.

Therefore, when:
User: U
Patient-Record: O
Roles: R={Patient, Nurse, HNurse, Doctor}
Operations: OP={view, append, copy}
Application Context:
   Relationship:
      ar=Affiliation Relationship
      doctor=Doctor-Patient Relationship
      fr=Immediate Family Relationship;
in a formal specification the role-Permission Assignment with Context Constraints may be written:
PA(HNurse, O, view) [[ar(doctor(owner(O))))==ar(usr(HNurse)) && ar(fr(owner(O)))!=ar(usr(HNurse))]];
where:
[[ ]] represents the context constraints;
== is equal;
usr is the actual identity of the user who is acting as the role (here, of HNurse);
!= is not equal; and
&& is a logical AND.

The above expression specifies that only when the expression within [[ ]] evaluates to true, can the user with the HNurse role view the object O.

Example 2

Medical researchers can only view records of patients who have taken some medicines that are the subject of the researchers' study.

For this constraint, determining user access within the role's permission requires extensive knowledge about the record's content, i.e., medicines, and information about the individual user (subject) and the user's studies (likely to be environmental content stored outside the controlled computer system). A parenthetical category review of Example 2 shows: Medical researchers (role) can only (constraint) view (operations) records of patients (object) who have taken some medicines (object content) that are the subject of the researchers' (subject content) study (environment content).

Therefore, when:
Patient-Record: O
Roles: R={Researcher}
Operations: OP={view, append, copy}
Application Context:
   Relationship: rcr=Role-RecordContent Relationship;
in a formal specification, the role-Permission Assignment with Context Constraints may be written as following:
PA (Researcher, O, view) [[rcr(usr(Researcher), medicine-content(O))]].

The above expression specifies that only when the expression within [[ ]] evaluates to true, can the user with the Researcher role view the object O, where usr is defined as in Example 1.

Example 3

Medical researchers can only view records of patients who exhibit similar symptoms as those exhibited by patients who suffer from the SARS Disease.

For this constraint, determining user access requires external access to databases that describe symptoms for the SARS disease. A parenthetical category review of Example 3 shows: Medical researchers (role) can only (constraint) view (operation) records of patients (object) who exhibit similar symptoms (object content) as those exhibited by patients who suffer from the SARS Disease (environment content).

Therefore, when:
Patient-Record: O
Roles: R={Researcher}
Operations: OP={view, append, copy}
Application Context:
   Relationship:
      rcr=Role-RecordContent Relationship
      sr=similarity relationship;
in a formal specification, the role-Permission Assignment with Context Constraints may be written as:
PA(Researcher, O, view) [[rcr(Researcher, symptom-content (O)) && sr(symptom-content(O), symptoms(SARS))]].

The above expression specifies that only when the expression within [[ ]] evaluates to true, can the user with the Researcher role view the object O.

Example 4

Pediatricians are allowed to view their patients' parents' blood-test results, but only that part of the parental records.

For this constraint, determining user access requires extensive knowledge about record content and the context determination of complex relationships. A parenthetical category review of Example 4 shows: Pediatricians (role) are allowed to view their patients' parent (could be either of subject context derived from the patient identity or object content based on patient record contents) blood-test results (object content), but only (constraint) that part of the parental records.

Therefore, when:
User: U
Patient-Record: O
Roles: R={Pediatrician}
Operations: OP={view, append, copy}
Application Context:
   Relationship:
      pd=patient-doctor relationship
      pc=parent-child relationship
      rcr=role-content relationship;
in a formal specification, the role-Permission Assignment with Context Constraints may be written:
PA (Pediatrician, O, view) [[pd(child(owner(O)), usr(Pediatrician)) && rcr (Pediatrician, blood-content(O))]].

The above expression specifies that only when the expression within [[ ]] evaluates to true, can the user with the Pediatrician role view the object I.

Example 5

Records that have not been accessed within the last 5 years are not allowed to be accessed by doctors.

For this constraint, such as in a situation requiring the determination of a patient's medication, determining user access requires knowledge about the record's accessing history, i.e., metadata. A parenthetical category review of Example 5 shows: Records (objects) that have not been accessed (object content) within the last five years (environment content) are not allowed access by doctors (role).

Therefore, when:
Patient-Record: O
Roles: R={Doctor}
Operations: OP={view, append, copy}
Application Context:
   Relationship: 5 years duration
   lat: last access time;
System Context:
   currentTime;
in a formal the role-Permission Assignment with Context Constraints may be written:
PA(Doctor, O, view) [[currentTime−lat(O)<=5-years]]

The above expression specifies that only when the expression within [[ ]] evaluates to true, can the user with the Doctor role view the object O.

Example 6

An anesthesiologist is allowed to view the genetic makeup records of a patient if and only if the elapsed time of an anesthetic application to the patient during surgery is three hours or greater.

For this constraint, even within the same session, the same role (Anesthesiologist) may have different access rights for the same object (the genetic makeup record) depending upon the request time (environmental content).

Patient-Record: O
Roles: R={Anesthesiologist}
Operations: OP={view, append, copy}
System Context:
   anesthetic elapsed Time;
in a formal specification, the role-Permission Assignment with Context Constraints may be written:
PA(Anesthesiologist, O, view) [[3:00<=anesthetic elapsed Time]]

The above expression specifies that only when the expression within [[ ]] evaluates to true, can the user with the Anesthesiologist role view the object O.

While certain exemplary embodiments have been put forth to illustrate the present invention, these embodiments are not to be taken as limiting to the spirit or scope of the present invention which is defined by the appended claims.

We claim:

1. A Role Based Access Control (RBAC) method performed by a data processor, comprising:
retaining a role for a user having access to a computer system, the role including access constraints;
receiving a request for access to an object of the computer system from the user;
verifying the role has access to the object;
granting or denying access to the object in response to the request by extracting context and content from internal to the computer system and external to the computer system, wherein granting access to the object includes altering the access constraints of the role for the request according to the context and content from internal to the computer system and external to the computer system.

2. The Role Based Access Control (RBAC) method according to claim 1, wherein the extracted internal content includes text extracted from the requested object.

3. The Role Based Access Control (RBAC) method according to claim 1, further comprising extracting external content from at least one of an external database or Internet.

4. The Role Based Access Control (RBAC) method according to claim 1, wherein the access constraints are specified using Structured Query Language (SQL), Relational Algebra, or Prepositional Logic.

5. The Role Based Access Control (RBAC) method according to claim 1, wherein the external content and the external context are obtained via a search mechanism that uses crawlers, via a search mechanism that uses a mediator, via a search mechanism using text search engines, via a search mechanism as used in database management systems, via a search mechanism as used in reconciled structured repositories, or via a search mechanism as used in geospatial database searches.

6. The Role Based Access Control (RBAC) method according to claim 1, wherein the internal content, internal context, external content and external context are obtained via an extraction technique using part of speech tagging.

7. The Role Based Access Control (RBAC) method according to claim 1, wherein the internal content, internal context, external content and external context are obtained via an extraction technique using conventional term extraction, via an extraction technique using term co-occurrence, via an extraction technique using inference networks, or via an extraction technique using language models.

8. A Role Based Access Control (RBAC) method performed by a data processor, comprising:
   retaining a role for a user having access to a computer system, the role including access constraints;
   receiving a request from a user for an operation on an object of the computer system, the computer system including an environment;
   verifying the access constraints of the role by:
       extracting content internal to the computer system about at least one of the user, the role, the object, and the environment;
       extracting content external to the computer system about at least one of the role, the user, the object, and the environment;
       extracting context external to the computer system about at least one of the user, the role, the object, and the environment;
       extracting context internal to the computer system about at least one of the role, the user, the object, and the environment;
   altering the access constraints of the role for the request according to the extracted context and content from internal to the computer system and external to the computer system; and
   granting access to the operation.

9. The Role Based Access Control (RBAC) method according to claim 8, wherein the extracted internal content includes text extracted from the requested object.

10. The Role Based Access Control (RBAC) method according to claim 8, wherein the extracting content external to the system comprises extracting content from at least one of an external database or an Internet.

11. The Role Based Access Control (RBAC) method according to claim 8, wherein extracting context and content comprises at least one of information retrieval, data mining, or a natural language processing technique.

12. The Role Based Access Control (RBAC) method according to claim 8, wherein extracting context and content from internal to the computer system and external to the computer system comprises information retrieval.

13. The Role Based Access Control (RBAC) method according to claim 8, wherein extracting context and content from internal to the computer system and external to the computer system comprises data mining.

14. The Role Based Access Control (RBAC) method according to claim 8, wherein extracting context and content from internal to the computer system and external to the computer system comprises a natural language processing technique.

15. The Role Based Access Control (RBAC) method according to claim 8, wherein the access constraints are specified using Structured Query Language (SQL), Relational Algebra, or Prepositional Logic.

16. The Role Based Access Control (RBAC) method according to claim 8, wherein the external content and the external context are obtained via a search mechanism that uses crawlers.

17. The Role Based Access Control (RBAC) method according to claim 8, wherein the external content and the external context are obtained via a search mechanism that uses a mediator.

18. The Role Based Access Control (RBAC) method according to claim 8, wherein the external content and the external context are obtained via a search mechanism using text search engines.

19. The Role Based Access Control (RBAC) method according to claim 8, wherein the external content and the external context are obtained via a search mechanism as used in database management systems.

20. The Role Based Access Control (RBAC) method according to claim 8, wherein the external content and the external context are obtained via a search mechanism as used in reconciled structured repositories.

21. The Role Based Access Control (RBAC) method according to claim 8, wherein the external content and the external context are obtained via a search mechanism as used in geospatial database searches.

22. The Role Based Access Control (RBAC) method according to claim 8, wherein the internal content, internal context, external content and external context are obtained via an extraction technique using part of speech tagging.

23. The Role Based Access Control (RBAC) method according to claim 8, wherein the internal content, internal context, external content and external context are obtained via an extraction technique using conventional term extraction.

24. The Role Based Access Control (RBAC) method according to claim 8, wherein the internal content, internal context, external content and external context are obtained via an extraction technique using term co-occurrence.

25. The Role Based Access Control (RBAC) method according to claim 8, wherein the internal content, internal context, external content and external context are obtained via an extraction technique using inference networks.

26. The Role Based Access Control (RBAC) method according to claim 8, wherein the internal content, internal context, external content and external context are obtained via an extraction technique using language models.

* * * * *